United States Patent

Jason

[11] 3,750,541
[45] Aug. 7, 1973

[54] METHOD OF MAKING A COMPOSITE PICTURE TRANSPARENCY

[76] Inventor: John J. Jason, 21165 Escondido St., Woodland Hills, Calif. 91364

[22] Filed: Apr. 26, 1972

[21] Appl. No.: 247,871

[52] U.S. Cl. .................. 95/18 R, 40/137, 95/36 R, 355/46, 355/54, 355/77, 355/79
[51] Int. Cl. ............................................ G03b 27/02
[58] Field of Search .................. 355/77, 54, 79, 46, 355/76; 95/18 P, 36 R, 18 R; 40/137

[56] References Cited
UNITED STATES PATENTS

| | | | |
|---|---|---|---|
| 2,950,644 | 8/1960 | Land | 95/18 P |
| 3,042,356 | 7/1962 | Audino | 355/73 X |
| 525,439 | 9/1894 | Blackmore | 95/36 R |
| 3,099,195 | 7/1963 | Goodbar | 95/18 P |

*Primary Examiner*—Joseph F. Peters
*Assistant Examiner*—Michael D. Harris
*Attorney*—Arnold B. Silverman

[57] ABSTRACT

A method of making a multiple picture composite photographic transparency including providing a number of shutter elements equal to the number of pictures to be created on the composite transparency. Each shutter having a number of transparent stripes for permitting transparency film exposure therethrough and a number of dark stripes resisting transparency film exposure therethrough disposed in alternating position with respect to the transparent stripes. A first shutter member is positioned in indexed surface to surface contact with respect to the unexposed transparency film. A first picture member is projected onto the portions of the transparency film which are exposed through the shutter. The first shutter is then removed and a second shutter is placed in a second indexed position with respect to the transparency film in surface to surface contact therewith. A second picture member is exposed through the second shutter transparent stripes onto the transparency film. Additional picture members may be similarly projected on the exposed transparency film with the use of additional shutters. Shutter and transparency film indexing means are employed to insure sequential indexed positioning of the respective shutters with respect to the transparency film. The transparency film and the successive shutters are preferably positively retained in intimate surface to surface contact during picture exposure. Vacuum means may be employed for this purpose.

11 Claims, 7 Drawing Figures

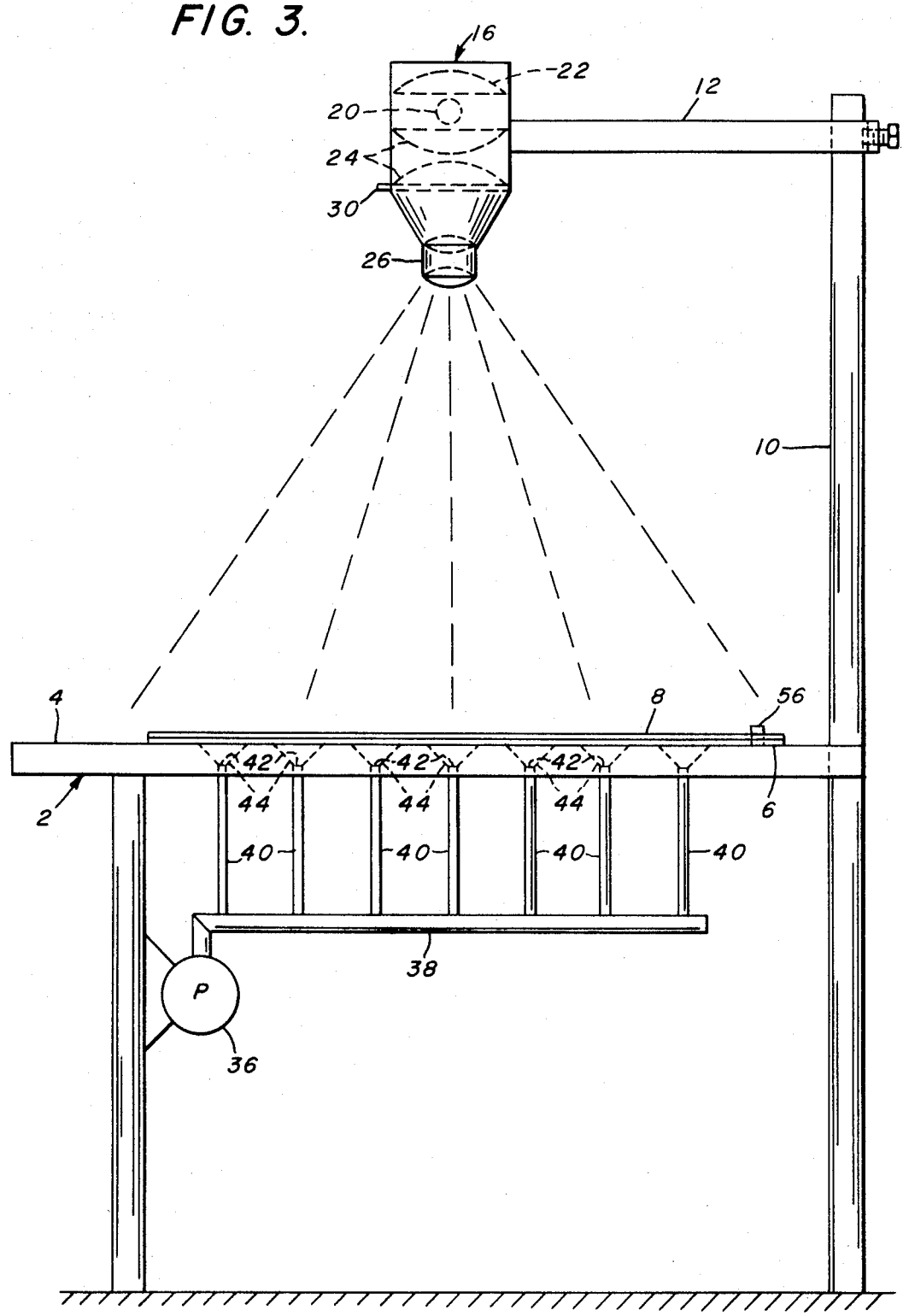

3,750,541

METHOD OF MAKING A COMPOSITE PICTURE TRANSPARENCY

BACKGROUND OF THE INVENTION

1. Field of the Invention

This invention relates to a method of making a composite photographic transparency which is adapted to be used in displaying a number of pictures sequentially from a single transparency as a result of a masking element which is employed to prevent display of all but one picture at a single time. More specifically, this invention relates to an improved method of precisely exposing predetermined portions of a transparency film to sequentially projected independent pictures.

2. Description of the Prior Art

It has been known that advantageous display of a number of individual photographs sequentially from a single transparency may be obtained by creating a composite transparency having a plurality of transparent picture stripes of each independent picture. The picture stripe segments for a given picture are disposed in parallel spaced relationship. Additional picture stripes for other pictures are similarly disposed in spaced parallel relationship in alternating position with respect to stripes of other pictures. In addition, all of the picture stripes are of the same height. As a result, one may employ a mask which will permit viewing of only a single picture's stripe-like segments at a given time. Subsequently, the mask and transparency may be subjected to relative movement to permit independent display of a second transparency picture. If the picture stripe segments are of a sufficiently small height, the viewer automatically integrates the various segments into a complete picture and he is unaware of the fact that only a certain relatively small portion of the original picture is being displayed. Systems of this general type are disclosed in U. S. Pat. Nos. 1,066,766, 1,460,674 and 3,082,560. In addition, a display system of this type is disclosed in applicant's co-pending joint application (Ser. No. 247,869) entitled "Visual Display Assembly" filed of even date herewith.

One of the difficulties which has prevented wide commercial acceptance of displayers of this type is the difficulty encountered in fabricating multiple picture transparencies on a commercial basis with sufficient precision to permit reliable and extended use of the transparency in such a display system. U. S. Pat. No. 3,082,560 contains a disclosure of a method of manufacturing a composite transparency. In this system a single mask element is moved to various positions with respect to a film with exposure occurring at a number of mask-film positions. Unfortunately, there are not readily available means for effectively moving a single mask element with the precision required for the production of clear display pictures and this prior patent provides no teaching of suitable apparatus or a suitable method for effecting such movement in a precisely indexed fashion.

One must bear in mind the fact that the height of picture stripe transparency sections is frequently on the order of 12 to 25 thousandths of an inch. As a result, any acceptable method of manufacturing such a composite transparency must offer specific precisely controlled means of creating such a structure. U. S. Pat. No. 1,066,766 also suggests the use of a single movable screen in the manufacture of a composite transparency. There is no discussion of how this precise movement is to be accomplished. As dimensions are not disclosed it must be assumed that either these earlier teachings were inoperative or that they relate to less refined structures which do not employ critically controlled, small transparency picture heights which are required to produce a clear picture.

There remains, therefore, a distinct need for a method of fabricating a precision composite transparency having high refinement of picture stripes of sufficiently small dimension and predetermined relative picture stripe positioning to provide picture displays of great clarity. There is a further need for such a method which will permit economical fabrication on a commercial scale with assurance of accurate reproduction even on a large scale basis.

SUMMARY OF THE INVENTION

The above-described need has been met by the method of the present invention. The present invention employs a number of shutter elements equal to the number of individual pictures which are to be provided on the transparency. Each shutter is independently indexed with respect to the transparency film to permit precise predetermined exposure of the sequentially projected pictures and the resultant creation of a precise composite transparency. Each shutter is provided with a number of transparent stripes which permit transparency film exposure therethrough. In addition, the shutter has a number of dark stripes which resist transparency film exposure therethrough disposed in alternating position with respect to the transparent stripes. In the preferred practice of the invention the shutter and transparency film are positively retained in surface to surface engagement to avoid undesired transparency picture stripe overlap or gaps therebetween. This surface to surface engagement is preferably maintained by supplemental means, such as a vacuum system.

Indexing means are provided to insure registered positioning of the shutters and the transparency film. Among the preferred forms of indexing means is the use of indexing members which project upwardly from an exposure table surface through precisely positioned openings in the shutters and the transparency.

The resultant transparency film may then be developed in accordance with conventional black and white or color processing techniques to create the composite transparency for display use. If desired, the developed transparency may then be used advantageously as a master in the creation of additional composite transparencies.

It is an object of this invention to provide a method of manufacturing a precision composite transparency having a number of individual pictures divided into a plurality of spaced parallel picture stripes.

It is another object of this invention to provide an economical means for fabricating such composite transparency films employing methods which guarantee reliable production of the precisely controlled dimensions.

It is another object of this invention to provide such a method wherein a number of shutters equal to the number of total pictures to be provided on the composite transparency is employed and indexing is effected through mechanical means.

It is yet another object of this invention to provide a method of effectively sequentially indexing the respective shutters with respect to a transparency film employing positive means for maintaining the desired intimate surface to surface contact between the shutters and transparency film.

These and other objects of the invention will be more fully understood from the following description of the invention, on reference to the illustrations appended hereto.

BRIEF DESCRIPTION OF THE DRAWINGS

FIG. 3 is a partially schematic elevational view of one form of apparatus employed in the present invention.

DESCRIPTION OF THE PREFERRED EMBODIMENTS

Figure 1:
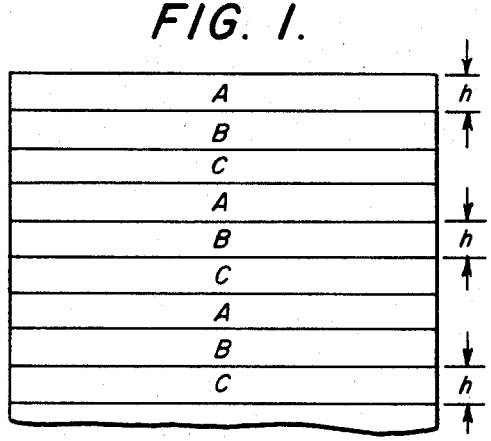
FIG. 1 is a schematic illustration of a type of composite transparency produced by the method of this invention.

Referring now more specifically to FIG. 1, there is shown a form of composite transparency having three distinct pictures which have been divided into three series of stripe-like picture segments A, B, C. It is noted that all of the stripe-like picture segments A, B, C have a height $h$ which is uniform from one end of the stripes to the other. The picture stripes A are generally parallel to each other and are disposed in spaced relationship with respect to each other. Similarly, the picture stripes B are parallel to each other and in spaced relationship with respect to each other. The same is true with respect to the picture stripes C. In this form, approximately one-third of each of the original pictures is included within the transparency but as height $h$ will be in the neighborhood of about 0.020 to 0.030 inch, the deletions will not be readily apparent to one viewing the displayed composite transparency.

Figure 2:
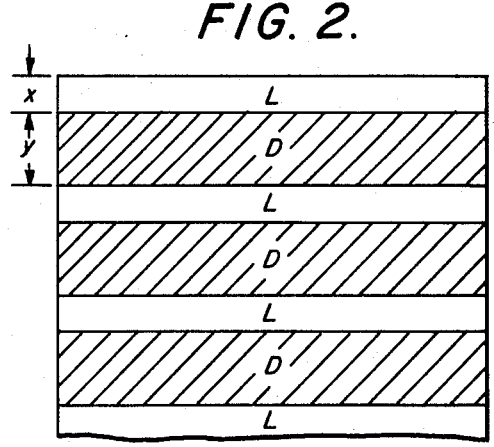
FIG. 2 is a schematic illustration of a type of shutter element employed in the method of this invention.

The shutter shown in FIG. 2 has a plurality of parallel transparent stripes L for permitting transparency film exposure therethrough and a plurality of parallel dark stripes D which resist transparency film exposure therethrough. Stripes L are disposed in alternating position with respect to stripes D. In the form shown, transparent stripes L will have a height $x$ equal to the height $h$ of stripe-like picture segments A, B, C. Dark stripes D will have a height $y$ which is twice the height of transparent stripes L. As a result, when a shutter is positioned in surface to surface contact with an unexposed or partially exposed transparency film, the only portions of the transparency film which will be exposed are stripe-like segments which are exposed through transparent stripes L which are of height $x$ equal to height $h$. As used herein, the term "surface to surface contact" and words of similar import shall refer to contact between any surface of a shutter or transparency and any surface of a transparency film, including the preferred contact between the emulsion covered surface of the shutter or transparency and the emulsion covered surface of the transparency film.

One convenient means of fabricating a shutter of the type shown in FIG. 2 is to expose a sheet of film with portions which are to become dark stripes D being exposed and the portions which are to become transparent stripes L remaining unexposed. After this exposure, the film may be developed in accordance with conventional photographic practices to create a shutter having the desired stripes.

Referring now to FIG. 3, a form of apparatus suitable for the practice of the process of this invention will now be considered. A developing table 2 is provided with an upper exposure surface 4. Positioned upon the exposure surface 4 are an unexposed transparency film 6 and an overlying indexed shutter 8. In the preferred form, the transparency film 6 has its emulsion covered surface facing upwardly and the shutter 8 has its emulsion covered surface facing downwardly. Extending upwardly from the table 2 is a vertical support 10 which is connected to a horizontal cantilevered support 12. Secured to the free end of the horizontal support 12 is a projection assembly 16. The projection assembly 16 has a light source 20, a rearwardly disposed reflector 22, a condenser lens assembly 24 and a wide angle lens 26. Positioned within the projector assembly is a color picture 30 which is to be projected onto composite transparency film 6 through shutter 8 in a manner to be described in greater detail below.

Figure 4:
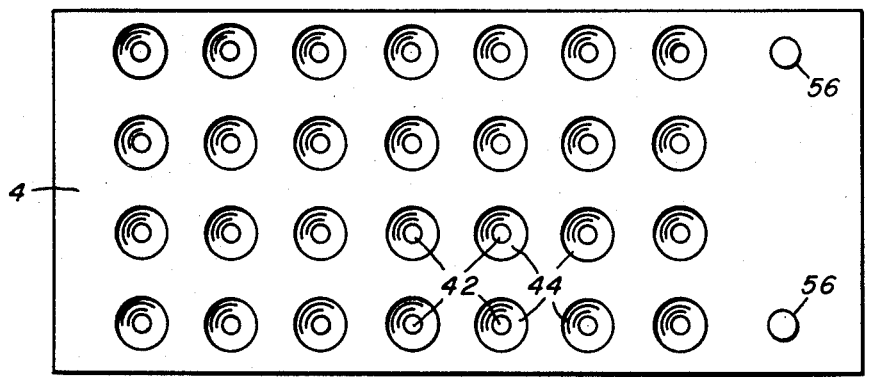
FIG. 4 is a top plan view, partially schematic, of an exposure table surface employable in the practice of the present invention.

In order to maintain the desired precise indexed relationship between each shutter and the transparency film 6, it is preferred to provide positive means for insuring firm surface to surface interengagement. As is shown in FIGS. 3 and 4, the present form employs a vacuum pump 36 which has a vacuum line 38 communicating with a number of branch vacuum lines 40 which in turn communicate with the undersurface of the transparency film 6 and shutter 8 through openings 42 in table 6. In the form shown, the upper extremities of branch lines 40 are flared outwardly to provide an expanded entrance 44 thereto. In effecting positive retention of the surface to surface engagement between the transparency film 6 and shutter 8, the vacuum is employed to urge the members downwardly against table exposure surface 4 during projection of a picture. After projection of a given picture has been accomplished, the vacuum may be turned off by means of a suitable intermitter to permit removal of the shutter and replacement by another shutter. Also, at the end of the cycle, the vacuum withdrawal permits removal of both the shutter and transparency film. After shutter replacement or shutter and transparency film replacement, the vacuum may be initiated once again to permit exposure of the next picture.

Figure 5:
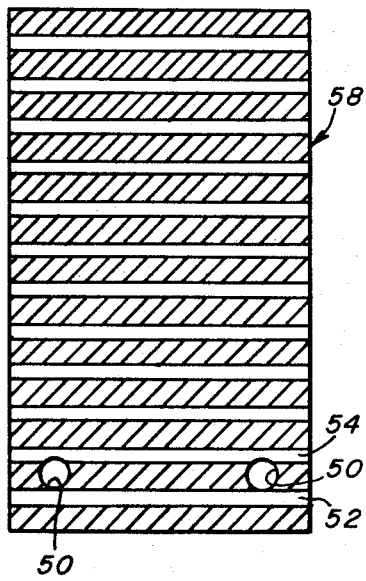
FIGS. 5 through 7 are schematic illustrations of three different shutters having a preferred form of indexing means.
Figure 6:
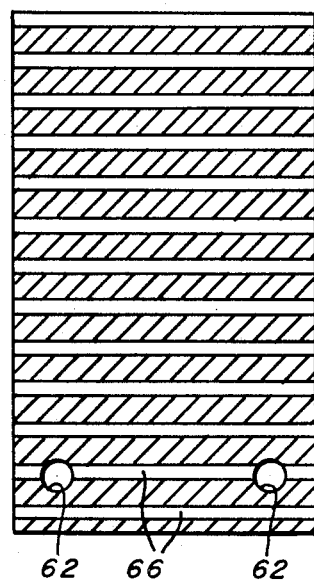
Figure 7:
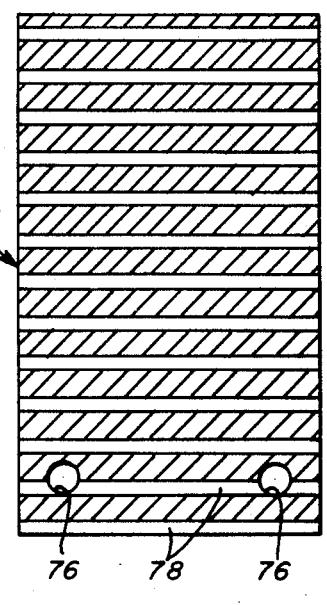

Referring now to FIGS. 5 through 7, the preferred form of indexing means will now be disclosed. FIGS. 5 through 7 each illustrate one of three shutters sequentially employed in establishing a three picture transparency. As is seen in FIG. 5, a pair of indexing openings 50 are provided in the shutter 58 adjacent one end thereof. The indexing openings 50 are positioned between shutter transparent stripe 52 and shutter transparent stripe 54, with the upper extremities of the openings 50 extending approximately to the middle of transparent stripe 54. In this instance, the indexing holes 50 have a diameter approximately equal to 2½ times the height $x$ of the transparent stripes. Similarly, the unexposed transparency is provided with a pair of holes spaced from each other a distance equal to that shown for the shutter 58 of FIG. 5. It will be appreciated that there is no particular critical diameter or shape for the indexing openings so long as they are of the same size and shape for a given combination of shutters and transparency films employed in a particular process sequence employing common indexing means.

In initiating exposure of a transparency film by the method of this invention, the transparency 6 is positioned on the exposure surface 4 (shown in FIGS. 3 and 4) with the indexing pins 56 extending through the openings in transparency film 6. The shutter 58 of FIG. 5 is then positioned over the transparency film 6 with indexing pins 56 projecting through indexing openings 50 in the shutter. (The indexing openings 50 are preferably of substantially the same size as the outer periphery of the indexing pins 56, but are sufficiently larger to permit the desired insertion of the pins 56 into the openings.) In this fashion the transparency 6 and the first shutter are positioned in relative fixed relationship on the exposure surface 4. If desired, the shutter 58 may be made larger or smaller than the transparency film 6 and a first set of indexing pins may be employed for the transparency 6 and a second set of indexing pins may be employed for the shutters. Also, if desired, more than two indexing pins or other suitable mechanical indexing means might be employed.

As has been stated above, in the preferred embodiment of this invention the emulsion covered surfaces of the shutters and transparency films are in surface to surface contact. While visual inspection may be employed to determine which shutter and transparency film surfaces should be oriented upwardly, this invention provides automatic means for determining the proper orientation. Referring to FIG. 4, a third projection (not shown) may serve as a surface indexing pin by positioning the same closer to one pin 54, 56 than to the other so that a corresponding opening in the shutter or transparency film will be aligned with the surface indexing pin and receive the same only when one of the two surfaces faces upwardly. An alternate approach would be to provide a unique profile on the surface indexing pin which is aligned with the surface indexing opening only when one surface faces upwardly.

A preferred method of establishing the indexing openings and surface indexing openings in the shutters and transparency film of this invention is to provide the precise staggered shutter position desired with respect to the transparency film and each other. When the shutters and film are in this position they are temporarily secured to prevent relative movement as by taping the same. The indexing openings may then be punched simultaneously with a single punch having the desired number of punching elements. For example, a single pair of hole punching elements could punch all of the openings 50, 62 and 76 simultaneously as a result of the staggered position of the shutters during punching. In this fashion, a single stroke of the punch completes a fully indexed set of shutters and transparency films.

After the shutter 58 and transparency film 6 are in position on the exposure surface 4, the vacuum pump 36 is turned on to positively retain the surface to surface contact between the shutter 58 and the transparency film 6. The first picture 30 is then projected onto the exposure table 4. The portions of the transparency film 6 which underlie the transparent stripes of the shutter 58 will be exposed to segments of the first picture 30 and will receive the images of the same within these limited exposed regions. The vacuum pump 36 is then turned off and the shutter 58 is then removed.

Referring now to FIG. 6, there is shown a shutter 60 which has the identical dimensioned alternating transparent stripes and dark stripes as does the shutter 58. It will be appreciated, however, that the indexing openings 62 are positioned differently with respect to the transparent and dark stripes thereon than the indexing openings 50 of shutter 58. The indexing openings 62 are shifted in position with respect to the transparent and dark stripes. The shift displaces openings 62 by a distance x from the position of the similar openings in shutter 58. As a result, the openings originate with a lower extremity in the middle of a dark stripe and an upper extremity projecting about one-fourth of the way into the next adjacent dark stripe. It will be appreciated that when shutter 60 is placed over unexposed transparency 6 with indexing pins 56 extending through openings 62, the transparent stripes 66 will contact and expose portions of the transparency film 6 immediately adjacent to those exposed by shutter 58. This positioning preferably will result in exposed transparency film sectors which are in adjacent abutting relationship with respect to the sectors previously exposed to the first picture 30.

After second shutter 60 is positioned on the exposure surface 4 with indexing pins 56 projecting through indexing openings 54, a second picture (not shown) is substituted for first picture 30 and vacuum pump 36 is operated once again to insure the desired positive surface to surface contact. The second picture is then exposed and the vacuum pump 36 is turned off to permit removal of shutter 60.

Referring now to shutter 74 shown in FIG. 7, it is provided with two indexing openings 76 which are of the same diameter as openings 50, 62. Openings 76 have been shifted a distance x with respect to the position of openings 62. The indexing openings 76 have a lower extremity within the lower extremity of transparency stripe 78 and project upwardly about three quarters of the way into the next adjacent dark stripe. It will be appreciated that positioning the third shutter 74 on exposure surface 4 with indexing pins 56 extending through openings 76 will produce exposure of the remaining unexposed portions of the transparency film 6 through the transparent stripes 78 of shutter 74. The vacuum pump 36 is employed for retention in the same manner as described above and a third picture is substituted for the second picture and projected onto the shutter covered transparency film.

In the preferred form of this invention, exposure of the transparency film will produce a "positive" which is "developed" by producing a print thereof. After the transparency film has been fully exposed in the above manner, it may be developed in accordance with conventional black and white or color photographic techniques. The resultant composite transparency may be then employed in a display viewer or may be employed as a master transparency in making other identical composite transparencies. In employing the transparency to make others, an unexposed transparency film is positioned in underlying surface to surface contact with respect to the processed composite transparency and suitable light is applied to expose the underlying transparency film through the composite master transparency. After such exposure, the exposed transparency film may be developed in a conventional fashion.

Such a system is particularly advantageous for commercial processing where a large volume of a particular transparency might be desired.

While for purposes of illustration, a composite transparency having segments of three individual pictures has been shown, it will be appreciated that the method of this invention is not so limited and it may be employed with any number of pictures up to the point where so little of each original picture appears in the final transparency that an objectionable lack of clarity is present. In general, it is contemplated that about two to six pictures may be provided on a single transparency with about two to five being preferred. By way of example, a transparency having three pictures may have individual picture stripe segments of about 0.025 inch in height and transparencies having five pictures may have individual picture stripe segments having a height of about 0.015 inch.

It will be appreciated that while for convenience of reference certain equipment orientations have been considered, these are not limiting upon the scope of the invention. For example, if desired, a transparent table exposure surface may have a shutter in contact therewith and an overlying transparency with projector means positioned under the exposure surface.

It will, therefore, be appreciated that the method of this invention provides effective means for insuring precisely indexed and accurate transparency production which results in improved clarity of the display image. In addition, in the preferred embodiment of the invention, mechanical indexing means are employed to automatically index the sequentially employed shutters with respect to a fixed composite transparency film. All of this is accomplished in a rapid and simple manner which is economical and suitable for large volume commercial production.

As will be apparent, not all of the method steps recited in the claims need be performed in the sequence recited. For example, the picture members may be placed in projecting position either prior to or after the shutter and transparency film.

Whereas particular embodiments of the invention have been described above for purposes of illustration, it will be evident to those skilled in the art that numerous variations of the details may be made without departing from the invention as defined in the appended claims.

I claim:

1. A method of making a multiple picture composite photographic transparency comprising
providing a number of shutters equal to the number of pictures to be created on said composite transparency with each said shutter having a number of transparent stripes for permitting transparency film exposure therethrough and a number of dark stripes resisting transparency film exposure therethrough disposed in alternating position with respect to said transparent stripes,
positioning an unexposed transparency film on an exposure surface,
positioning a first picture member in a projecting position with respect to said transparency film,
positioning a first said shutter in a first indexed position in surface to surface contact with respect to said unexposed transparency film,
directly projecting portions of said first picture member onto the portions of said transparency film exposed through said first shutter transparent stripes to establish a plurality of elongated parallel first picture stripes on said transparency film with the entire group of said first picture stripes containing not more than fifty per cent of said first picture,
simultaneously with said first picture projection preventing exposure of portions of said transparency film underlying said first shutter dark stripes,
removing said first shutter and placing a second shutter in a second indexed position in surface to surface contact with respect to said transparency film with said second shutter transparent stripes being in contact with previously unexposed portions of said transparency film and said second shutter dark stripes being in contact with said previously exposed portions of said transparency film,
directly projecting portions of a second picture member onto exposed portions of said transparency film through said second shutter transparent stripes to establish a second group of elongated parallel picture stripes on said transparency film with said second group of picture stripes containing substantially the same percentage of said second picture as said first group contained with respect to said first picture, and
simultaneously with said second picture projection preventing exposure of said first picture stripes and other portions of said transparency film underlying said second shutter dark stripes.

2. The method of making a composite transparency according to claim 1 including
after projecting said second picture onto said transparency film, sequentially projecting portions of one to four additional pictures onto previously unexposed portions of said transparency film by means of a number of sequentially indexed shutters equal to the number of said additional pictures being projected,
maintaining substantially the same percentage relationship between each said picture and its picture stripes as those established in connection with said first and second pictures and picture stripes, and
positioning shutter emulsion surfaces in contact with the transparency film emulsion surface.

3. The method of making a composite transparency of claim 2 including
subsequent to sequentially exposing said transparent film, developing said film to establish said composite transparency.

4. The method of making a composite transparency of claim 3 including
after completion of said transparency film exposure and developing the same to establish said composite transparency, positioning said composite transparency in surface to surface contact with an unexposed transparency film, and
exposing said unexposed transparency film through said composite transparency to convert said unexposed transparency film into a second said exposed transparency film identical with said first exposed transparency film.

5. The method of making a composite transparency of claim 1 including
establishing said picture stripes in abutting relationship with respect to adjacent picture stripes,
establishing each said picture stripe with a height of about 0.015 to 0.025 inch, and sequentially indexing said shutters with respect to said transparency film by indexing means which retain said shutter and said transparency film in relative fixed position.

6. The method of making a composite transparency of claim 5 including
establishing said composite transparency with each said individual picture provided by a number of spaced parallel picture stripes being of equal height and with adjacent picture stripes of different pictures being in adjacent abutting relationship with respect to each other, and
establishing said picture stripes with a width generally equal to the width of said transparency film.

7. The method of making a composite transparency of claim 1 including
positively retaining said transparency film in intimate surface to surface contact with each succeeding shutter during picture member projection.

8. The method of making a composite transparency of claim 7 including
effecting said positive retention by vacuum means which urge said transparency film and said shutter into surface to surface engagement, and
intermittently interrupting said vacuum retention to permit removal of a said shutter or a said transparency film.

9. Apparatus for making a composite picture transparency comprising
a number of shutters equal to the number of pictures to be created on said composite transparency with each said shutter having a number of transparent stripes for permitting transparency film exposure therethrough and a number of dark stripes resisting transparency film exposure therethrough disposed in alternating position with respect to said transparent stripes,
a first said shutter having first indexing openings disposed at a predetermined position with respect to a pair of spaced adjacent shutter transparent stripes and a second said shutter having second indexing openings disposed with respect to a pair of spaced adjacent shutter transparent stripes at a position displaced from the corresponding hole positions of said first indexing openings on said first shutter by a distance substantially equal to the height of said shutter transparent stripes,
any additional shutters having indexing openings displaced a distance substantially equal to the height of said transparent stripes with respect to the indexing opening positions on the next preceding shutter,
a film supporting exposure table,
indexing means for passing through said shutter indexing openings to sequentially index said shutters with respect to a transparency film on said exposure table,
vacuum means communicating with said exposure table to effect positive surface to surface engagement between said transparency film and said shutters, and
projector means for sequentially projecting portions of each picture onto exposed portions of said transparency film.

10. The apparatus of claim 9 including
said indexing means including at least two upwardly projecting indexing elements which are secured to said exposure table, whereby sequential passage of said indexing elements through said shutter indexing openings will permit projection of portions of said pictures sequentially onto previously unexposed portions of said transparency film to establish a plurality of spaced parallel elongated picture stripes on said transparency film for each said picture.

11. The apparatus of claim 10 including
said shutters having a surface orienting opening,
an upwardly projecting surface orienting means secured to said exposure table for extending through a surface orienting opening in said shutters and said transparency film, and
said surface orienting means being alignable with respect to said openings to permit passage therethrough only when said shutter and said transparency film have the desired surface orientation.

* * * * *